(12) United States Patent
Sato et al.

(10) Patent No.: US 11,719,124 B2
(45) Date of Patent: Aug. 8, 2023

(54) TURBOCHARGER

(71) Applicant: MITSUBISHI HEAVY INDUSTRIES ENGINE & TURBOCHARGER, LTD., Sagamihara (JP)

(72) Inventors: Takashi Sato, Tokyo (JP); Takuya Arakawa, Tokyo (JP); Takaya Futae, Tokyo (JP); Yosuke Dammoto, Sagamihara (JP); Akihiro Sugiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 78 days.

(21) Appl. No.: 17/431,643

(22) PCT Filed: Feb. 21, 2019

(86) PCT No.: PCT/JP2019/006436
§ 371 (c)(1),
(2) Date: Aug. 17, 2021

(87) PCT Pub. No.: WO2020/170376
PCT Pub. Date: Aug. 27, 2020

(65) Prior Publication Data
US 2022/0120191 A1    Apr. 21, 2022

(51) Int. Cl.
*F01D 25/16* (2006.01)
*F01D 25/18* (2006.01)
(Continued)

(52) U.S. Cl.
CPC ............. *F01D 25/16* (2013.01); *F01D 25/18* (2013.01); *F02B 39/14* (2013.01);
(Continued)

(58) Field of Classification Search
CPC ........ F01D 25/04; F01D 25/16; F01D 25/164; F01D 25/18; F02B 37/00; F02B 39/14;
(Continued)

(56) References Cited

U.S. PATENT DOCUMENTS

| 5,667,157 A | 9/1997 | Prew |
| 7,648,773 B2 * | 1/2010 | Takayama ............... C23C 30/00 384/322 |

(Continued)

FOREIGN PATENT DOCUMENTS

| CN | 101182615 A | 5/2008 |
| DE | 1 299 941 B | 7/1969 |

(Continued)

OTHER PUBLICATIONS

International Preliminary Report on Patentability and Written Opinion of the International Searching Authority, with an English translation, dated Sep. 2, 2021, for International Application No. PCT/JP2019/006436.

(Continued)

*Primary Examiner* — Jesse S Bogue
(74) *Attorney, Agent, or Firm* — Birch, Stewart, Kolasch & Birch, LLP

(57) ABSTRACT

A turbocharger includes a rolling bearing including at least one rolling element for rotatably supporting a rotational shaft, a bearing support cylinder located on a radially outer side relative to the rolling bearing, for supporting the rolling bearing, and a housing located on the radially outer side relative to the bearing support cylinder, for covering a circumference of the bearing support cylinder. Between an outer circumferential surface of the bearing support cylinder and an inner circumferential surface of the housing, a gap for forming an oil film by inflow of lubricant oil is provided. At least one of the outer circumferential surface of the bearing (Continued)

support cylinder and the inner circumferential surface of the housing includes an oil film holding portion for suppressing outflow of the lubricant oil from the gap. The oil film holding portion is a protrusion disposed on the outer circumferential surface of the bearing support cylinder, or a recess or the protrusion disposed on the inner circumferential surface of the housing.

5 Claims, 12 Drawing Sheets

(51) Int. Cl.
*F02B 39/14* (2006.01)
*F16C 33/66* (2006.01)
(52) U.S. Cl.
CPC ...... *F16C 33/6637* (2013.01); *F05D 2220/40* (2013.01); *F05D 2240/54* (2013.01); *F05D 2260/98* (2013.01)
(58) Field of Classification Search
CPC . F01M 11/02; F01M 2011/021; F16C 17/026; F16C 2360/24; F16C 33/107; F16C 33/6637; F05D 2220/40; F05D 2240/54; F05D 2260/96; F05D 2260/98; F16N 2210/14; Y02T 10/12
See application file for complete search history.

(56) References Cited

U.S. PATENT DOCUMENTS

| | | | | |
|---|---|---|---|---|
| 7,988,361 | B1* | 8/2011 | Mori | F16C 33/102 384/114 |
| 8,967,870 | B2* | 3/2015 | Ishii | F16C 33/22 384/129 |
| 10,570,959 | B2* | 2/2020 | Kouno | F16C 33/1065 |
| 2007/0009757 | A1 | 1/2007 | Takayama et al. | |
| 2012/0102957 | A1 | 5/2012 | Myers | |
| 2013/0164128 | A1 | 6/2013 | Nguyen-Schaefer et al. | |
| 2018/0073433 | A1* | 3/2018 | Noda | F16C 27/066 |

FOREIGN PATENT DOCUMENTS

| | | |
|---|---|---|
| DE | 10 2008 060 369 A1 | 6/2010 |
| DE | 10 2011 054 859 A1 | 5/2012 |
| DE | 10 2011 087 628 A1 | 6/2013 |
| DE | 102015200744 A1 | 7/2016 |
| EP | 3 760 850 A1 | 1/2021 |
| JP | 61-193230 U | 12/1986 |
| JP | 61-202713 U | 12/1986 |
| JP | 9-294942 A | 11/1987 |
| JP | 4-159421 A | 6/1992 |
| JP | 2006-90402 A | 4/2006 |
| JP | 2010-32059 A | 2/2010 |
| JP | 2014-20461 A | 2/2014 |
| JP | 2014-43919 A | 3/2014 |
| JP | 2014-51898 A | 3/2014 |
| WO | WO 2016/024189 A1 | 2/2016 |
| WO | WO 2016/070311 A1 | 4/2016 |
| WO | WO 2016-166832 A1 | 10/2016 |

OTHER PUBLICATIONS

International Search Report, dated May 28, 2019, for International Application No. PCT/JP2019/006436, with an English translation.
German Office Action for German Application No. 112019006674.9, dated Oct. 24, 2022.

* cited by examiner

TURBOCHARGER

TECHNICAL FIELD

The present disclosure relates a turbocharger.

BACKGROUND

A turbocharger includes a bearing for rotatably supporting a rotational shaft. For example, a rolling bearing for supporting the rotational shaft by a rolling element is known.

The rolling bearing does not include a damping element in the bearing itself, which may cause a shaft vibration. In order to damp the shaft vibration, a configuration is known in which an oil film is formed by causing lubricant oil to flow into a gap between the outer circumferential surface of a bearing support cylinder and the inner circumferential surface of a housing. However, even with such configuration, it is impossible to sufficiently hold the oil film for damping the shaft vibration, unless outflow of the lubricant oil is suppressed.

In this regard, in order to hold an oil film, Patent Document 1 discloses a configuration in which a recess is disposed in the outer circumferential surface of a member that corresponds to a bearing support cylinder ("bearing housing" in Patent Document 1) located on a radially inner side relative to a gap space where the oil film is formed.

CITATION LIST

Patent Literature

Patent Document 1: JP2006-90402A

SUMMARY

Technical Problem

However, with the configuration in which the recess is disposed in the outer circumferential surface of the bearing support cylinder as in Patent Document 1, it may be difficult to ensure rigidity of the bearing support cylinder by the recess.

In view of the above, an object of at least one embodiment of the present invention is to provide a turbocharger capable of holding the oil film while ensuring rigidity of the bearing support cylinder.

Solution to Problem (1) A turbocharger according to at least one embodiment of the present invention includes a rolling bearing including at least one rolling element for rotatably supporting a rotational shaft, a bearing support cylinder located on a radially outer side relative to the rolling bearing, for supporting the rolling bearing, and a housing located on the radially outer side relative to the bearing support cylinder, for covering a circumference of the bearing support cylinder. Between an outer circumferential surface of the bearing support cylinder and an inner circumferential surface of the housing, a gap for forming an oil film by inflow of lubricant oil is provided. At least one of the outer circumferential surface of the bearing support cylinder and the inner circumferential surface of the housing includes an oil film holding portion for suppressing outflow of the lubricant oil from the gap. The oil film holding portion is a protrusion disposed on the outer circumferential surface of the bearing support cylinder, or a recess or the protrusion disposed on the inner circumferential surface of the housing.

With the above configuration (1), the configuration without the recess being disposed in the outer circumferential surface of the bearing support cylinder is available, making it possible to ensure rigidity of the bearing support cylinder. Moreover, since the oil film holding portion suppresses outflow of the lubricant oil from the gap, it is possible to hold the oil film.

(2) In some embodiments, in the above configuration (1), at least a part of the housing is a porous layer, and the recess is formed by a hole, of a plurality of holes of the porous layer disposed on the inner circumferential surface of the housing, opening to the gap.

With the above configuration (2), the lubricant oil is collected in the hole opening to the gap, and the lubricant oil comes out of the hole even if a certain amount of the lubricant oil flows out of the gap. Thus, a holding capacity of the lubricant oil is improved.

(3) In some embodiments, in the above configuration (1) or (2), the recess includes a plurality of depressions disposed independently of each other at intervals in the inner circumferential surface of the housing.

With the above configuration (3), the lubricant oil is collected in the depressions disposed in the housing, and the lubricant oil comes out of the depressions even if a certain amount of the lubricant oil flows out of the gap. Thus, the holding capacity of the lubricant oil is improved.

(4) In some embodiments, in the above configuration (3), the recess includes the plurality of depressions in a staggered arrangement.

With the above configuration (4), each of the depressions has a partition wall, and an opening area of the recess relative to the inner circumferential surface of the housing increases. Thus, the holding capacity of the lubricant oil is improved.

(5) In some embodiments, in the above configuration (3) or (4), the recess includes the plurality of depressions which are different in opening area.

With the above configuration (5), it is possible to increase the number density of the depressions. Moreover, since each of the depressions has the partition wall, and the opening area of the recess relative to the inner circumferential surface of the housing increases, the holding capacity of the lubricant oil is improved.

(6) In some embodiments, in the above configuration (3), the plurality of depressions have hexagonally shaped partition walls, respectively, and the plurality of partition walls constitute a honeycomb-shaped partition wall as a whole.

With the above configuration (6), the honeycomb-shaped partition wall makes the lubricant oil less flow and increases the opening area of the recess relative to the inner circumferential surface of the housing. Thus, the holding capacity of the lubricant oil is improved.

(7) In some embodiments, in any one of the above configurations (3) to (6), the recess includes the plurality of depressions where a centroid connecting line connecting centroids in a cross-section parallel to a plane along an opening edge crosses a radial direction, and the centroid connecting line is directed downstream of a rotational direction of the rotational shaft toward the radially outer side.

With the above configuration (7), since the centroid connecting line in the cross-section of the depression has a direction crossing the radial direction, the holding capacity of the lubricant oil is improved. Moreover, it is possible to cause the lubricant oil, which flows in the circumferential direction in accordance with the rotation of the bearing support cylinder, to enter the recess to be collected. Thus, the holding capacity of the lubricant oil is improved.

(8) In some embodiments, in any one of the above configurations (1) to (7), the protrusion is disposed on at least one of the outer circumferential surface of the bearing support cylinder and the inner circumferential surface of the housing, and the protrusion partially narrows the gap in a radial direction.

With the above configuration (8), the Lomakin Effect works strongly when the lubricant oil passes through the narrow portion of the gap, and acts as a spring that expands the gap in the radial direction. Thus, a holding capability of a shaft center is improved, making it possible to reduce a shaft vibration.

(9) In some embodiments, in the above configuration (8), the at least one rolling element includes a plurality of first rolling elements arranged in a circumferential direction at a first axial position, and a plurality of second rolling elements arranged in the circumferential direction at a second axial position different from the first axial position, and the oil film holding portion includes a pair of protrusions disposed at axially equidistant positions, respectively, from an intermediate position between the first axial position and the second axial position.

With the above configuration (9), the Lomakin Effect acts at the axially equidistant positions of the pair of protrusions from the intermediate position between the first axial position and the second axial position where the rolling elements are arranged, respectively. Thus, it is possible to suppress occurrence of unbalance by the axial positions.

(10) In some embodiments, in the above configuration (9), the housing has an inlet for allowing the lubricant oil to flow into the gap, and the at least one rolling element and the pair of protrusions are disposed at axial positions on opposite sides of the inlet, and the protrusions are disposed at positions where axial distances between the inlet and the protrusions are smaller than an axial distance between the inlet and the at least one rolling element.

With the above configuration (10), since the protrusions are located upstream of the rolling elements, allowing the Lomakin Effect to act more strongly.

(11) In some embodiments, in the above configuration (9), axial distances of the pair of protrusions from the intermediate position are larger than an axial distance between the intermediate position and the first rolling element and an axial distance between the intermediate position and the second rolling element.

With the above configuration (11), the pair of protrusions produce the Lomakin Effect at the positions away from the intermediate position relative to the first rolling element and the second rolling element, respectively. Thus, the holding capability of the shaft center is improved.

(12) In some embodiments, in any one of the above configurations (1) to (11), the recess is disposed in the inner circumferential surface of the housing, and the recess includes a groove extending along a circumferential direction.

With the above configuration (12), the lubricant oil is collected in the groove, and the lubricant oil comes out of the groove even if a certain amount of the lubricant oil flows out of the gap. Moreover, the groove extending along the circumferential direction crosses an axial component in a flow velocity direction of the lubricant oil flowing in the axial direction and the circumferential direction, increasing a channel resistance and improving the holding capacity of the lubricant oil.

(13) In some embodiments, in any one of the above configurations (1) to (11), the recess is disposed in the inner circumferential surface of the housing, and the recess includes a lattice-shaped groove or a herringbone-shaped groove.

With the above configuration (13), the lubricant oil is collected in the groove, and the lubricant oil comes out of the groove even if a certain amount of the lubricant oil flows out of the gap. Moreover, the groove of the above-described shape crosses the axial component or a circumferential component in the flow velocity direction of the lubricant oil flowing in the axial direction and the circumferential direction, increasing the channel resistance and improving the holding capacity of the lubricant oil.

Advantageous Effects

According to at least one embodiment of the present invention, it is possible to provide a turbocharger capable of holding an oil film while ensuring rigidity of a bearing support cylinder.

DETAILED DESCRIPTION

Figure 1:
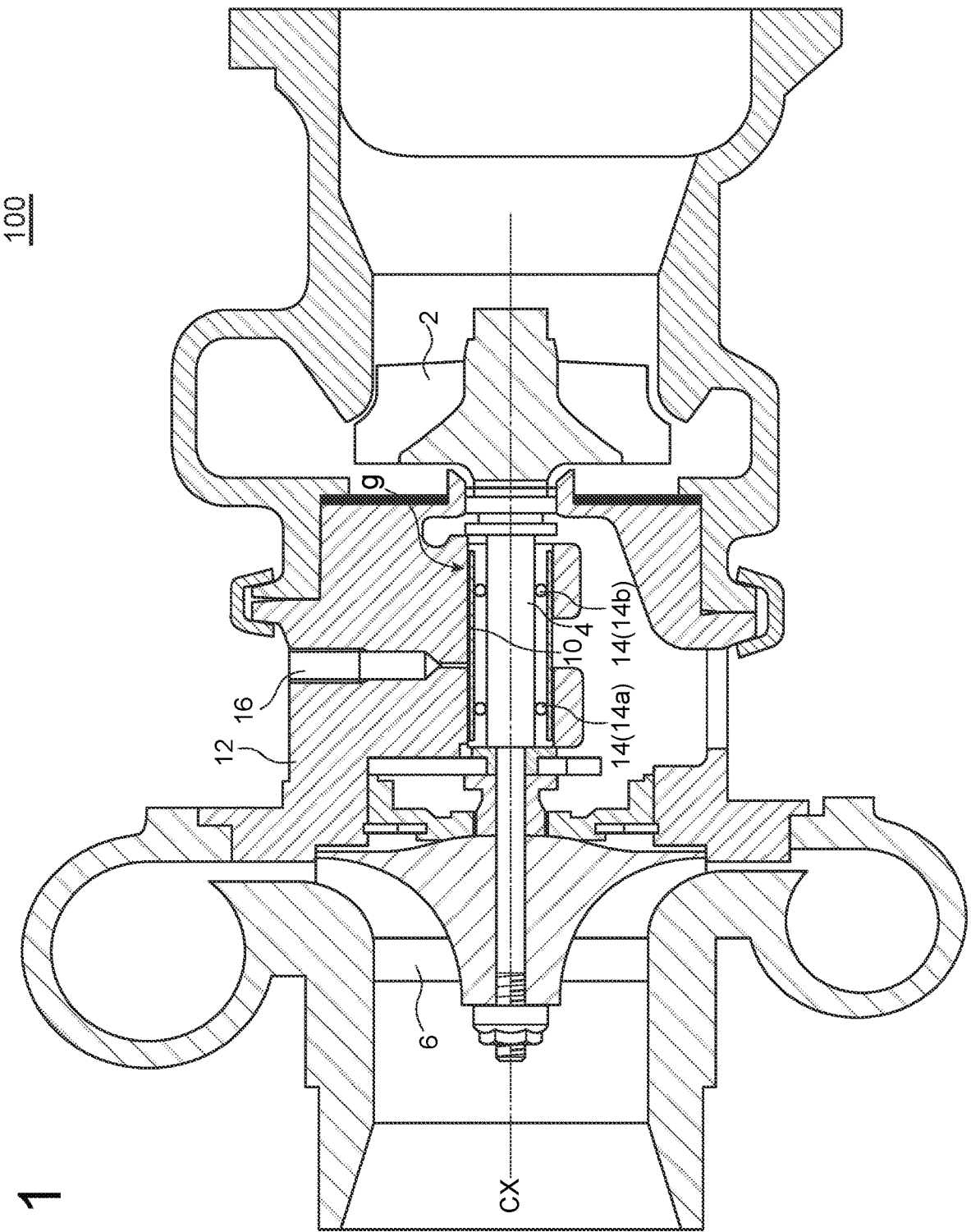
FIG. 1 is a schematic cross-sectional view taken along a rotational axis of a turbocharger according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a schematic cross-sectional view taken along a rotational axis CX of a turbocharger 100 according to an embodiment of the present invention. The turbocharger 100 is not particularly limited and only needs to be a turbocharger for forcedly sending intake air into an internal combustion engine. For example, the turbocharger 100 may be a turbocharger for an automobile or a turbocharger for a ship.

As shown in FIG. 1, the turbocharger 100 includes a turbine rotor 2, an impeller 6 coupled to the turbine rotor 2 via a shaft 4, a rolling bearing 8 for supporting the shaft 4, a bearing support cylinder 10 for supporting the rolling bearing 8, and a housing 12 for covering the circumference of the bearing support cylinder 10.

The turbocharger 100 is configured to rotary-drive the turbine rotor 2 with an exhaust gas of an engine (not shown), compress air through rotation of the impeller 6 disposed coaxially with the turbine rotor 2, and supply the compressed air to the engine.

In the following description, the axial direction of the turbine rotor 2 will simply be referred to as the "axial direction", and the radial direction of the turbine rotor 2 will simply be referred to as the "radial direction", and the circumferential direction of the turbine rotor 2 will simply be referred to as the "circumferential direction". A position closer to the rotational axis CX of the turbocharger 100 will be referred to as a "radially inner side", and a position farther away from the rotational axis CX of the turbocharger 100 will be referred to as a "radially outer side".

The rolling bearing 8 includes at least one rolling element 14 for rotatably supporting the shaft 4 as a rotational shaft. FIG. 1 shows a case where the rolling element 14 has a spherical shape. However, the rolling element 14 may has a roller shape. That is, the rolling bearing 8 may be a ball bearing or may be a roller bearing. In the present application, constituent elements such as an outer ring, an inner ring, and a retainer of the rolling bearing 8 are not illustrated. However, the bearing support cylinder 10 may be configured to include the outer ring.

At least one rolling element 14 includes a plurality of first rolling elements 14a arranged in the circumferential direction at a first axial position, and a plurality of second rolling elements 14b arranged in the circumferential direction at a second axial position different from the first axial position. The bearing support cylinder 10 is located on the radially outer side relative to the rolling bearing 8. The housing 12 is located on the radially inner side relative to the bearing support cylinder 10.

Between the outer circumferential surface of the bearing support cylinder 10 and the inner circumferential surface of the housing 12, a gap g for forming an oil film by inflow of lubricant oil is provided. The gap g corresponds to a radial interval between the outer circumferential surface of the bearing support cylinder 10 and the inner circumferential surface of the housing 12, and is a space extending along the circumferential direction. The housing 12 has an inlet 16 for allowing inflow of the lubricant oil, and the lubricant oil flowing in from the inlet 16 forms the oil film in the gap g.

At least one of the outer circumferential surface of the bearing support cylinder 10 and the inner circumferential surface of the housing 12 includes an oil film holding portion for suppressing outflow of the lubricant oil from the gap g. The oil film holding portion is a protrusion 30 disposed on the outer circumferential surface of the bearing support cylinder 10, or a recess 20 or the protrusion 30 disposed on the inner circumferential surface of the housing 12. The details of the protrusion 30 and the recess 20 will be described later.

With the above configuration, the configuration without the recess 20 being disposed in the outer circumferential surface of the bearing support cylinder 10 is available, making it possible to ensure rigidity of the bearing support cylinder 10. Moreover, since the oil film holding portion (the recess 20 or the protrusion 30) suppresses outflow of the lubricant oil from the gap g, it is possible to hold the oil film.

The housing 12 is designed to have a larger radial thickness than the bearing support cylinder 10. Thus, even if the recess 20 is disposed in the housing 12, unlike the case of the bearing support cylinder 10, it is possible to ensure rigidity of the housing 12.

Figure 2:
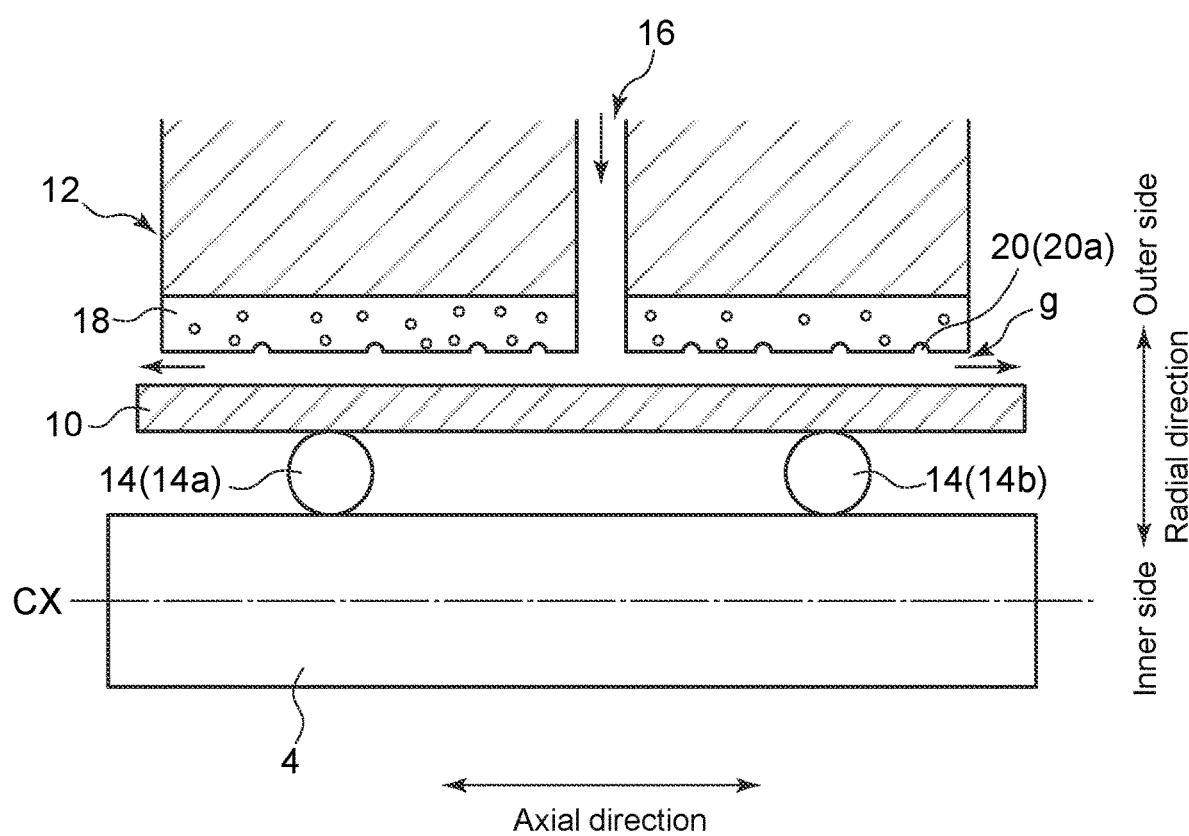
FIG. 2 is an enlarged cross-sectional view of a vicinity of a gap in the cross-section taken along the rotational axis of the turbocharger according to an embodiment.

FIG. 2 is an enlarged cross-sectional view of the vicinity of the gap g in the cross-section taken along the rotational axis CX of the turbocharger 100 according to an embodiment. In an embodiment, as shown in FIG. 2, a portion of the housing 12 facing the gap g is a porous layer 18, and of a plurality of holes of the porous layer 18 disposed on the inner circumferential surface of the housing 12, holes opening to the gap g form a plurality of recesses 20a, respectively. In FIG. 2, an entire portion of the inner circumferential surface of the housing 12 exposed to the gap g serves as the porous layer 18. However, the porous layer 18 may be a part of the portion of the inner circumferential surface of the housing 12 exposed to the gap g.

As indicated by arrows in FIG. 2 and FIGS. 3, 8, 9 to be described later, the lubricant oil flowing in from the inlet 16 reaches the gap g and flows along the axial direction in the gap g. The lubricant oil eventually flows out of the gap g. However, in order to reduce a shaft vibration, the lubricant oil is required to be held as the oil film without disappearing from the gap g.

In this regard, with the above configuration, the lubricant oil is collected in the holes (recesses 20a) opening to the gap g, and the lubricant oil comes out of these holes even if a certain amount of the lubricant oil flows out of the gap g. Thus, a holding capacity of the lubricant oil is improved.

Figure 3:
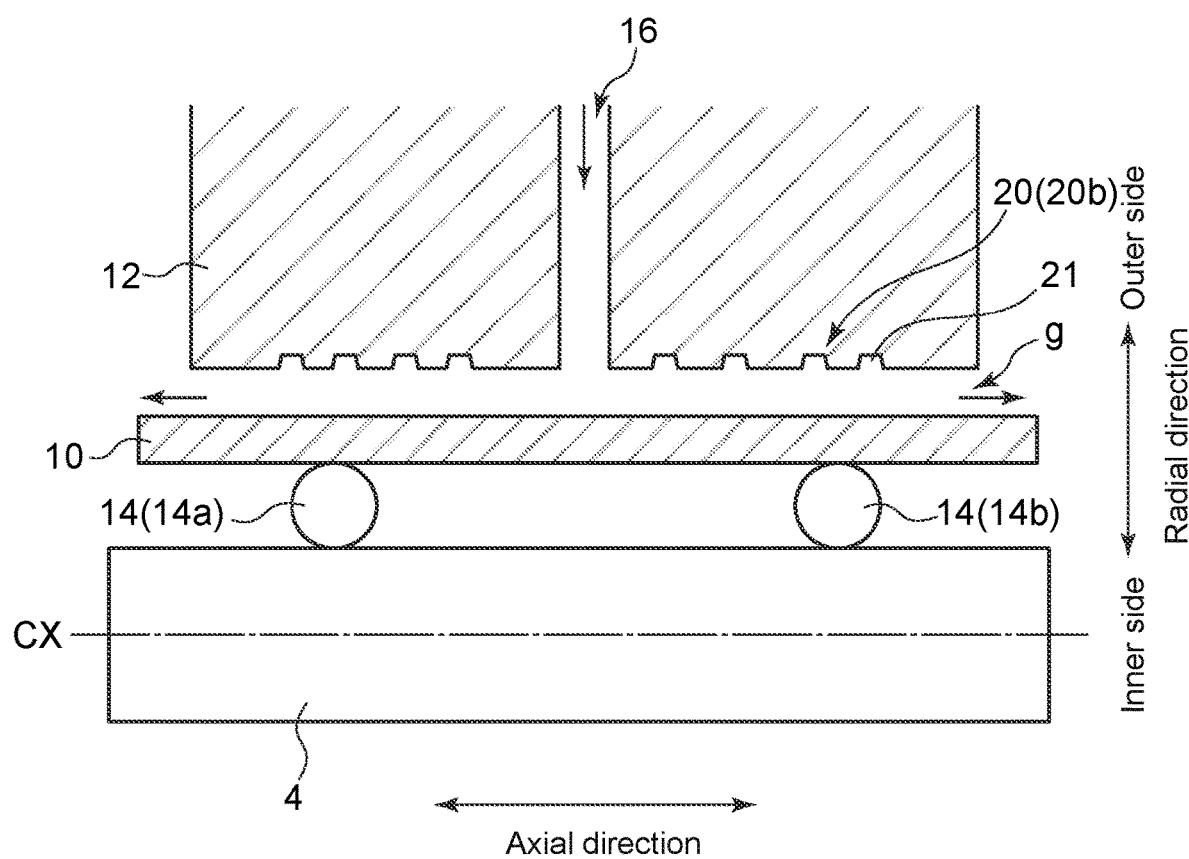
FIG. 3 is an enlarged cross-sectional view of the vicinity of the gap in the cross-section taken along the rotational axis of the turbocharger according to an embodiment.
Figure 4A:
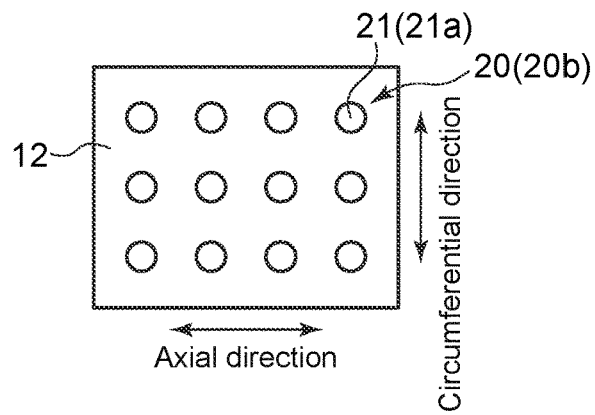
FIG. 4A is a schematic view of a recess (depressions) of the turbocharger as viewed from a gap side according to an embodiment.
Figure 4B:
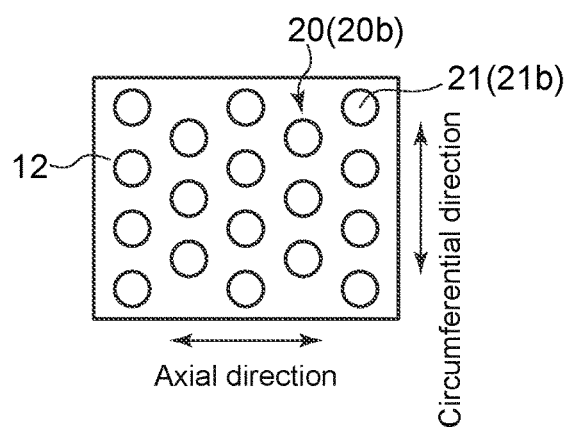
FIG. 4B is a schematic view of the recess (depressions) of the turbocharger as viewed from the gap side according to an embodiment.
Figure 4C:
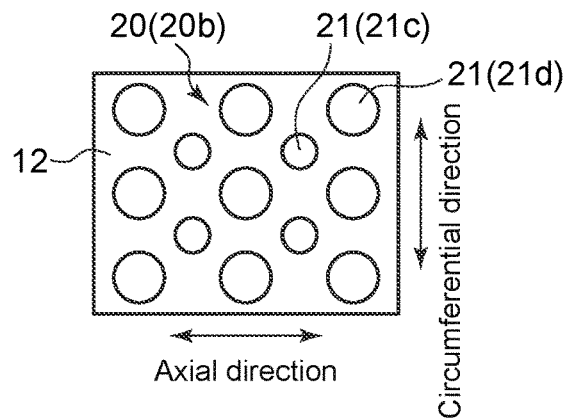
FIG. 4C is a schematic view of the recess (depressions) of the turbocharger as viewed from the gap side according to an embodiment.
Figure 4D:
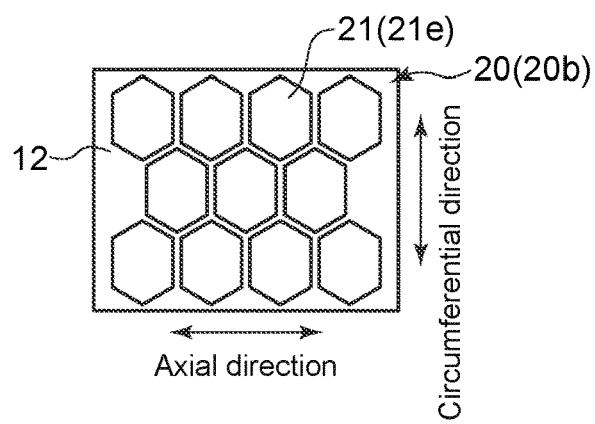
FIG. 4D is a schematic view of the recess (depressions) of the turbocharger as viewed from the gap side according to an embodiment.

FIG. 3 is an enlarged cross-sectional view of the vicinity of the gap g in the cross-section taken along the rotational axis CX of the turbocharger 100 according to an embodiment. FIG. 4A is a schematic view of a recess 20b (depressions 21a) of the turbocharger 100 as viewed from a side of the gap g according to an embodiment. FIG. 4B is a schematic view of the recess 20b (depressions 21b) of the turbocharger 100 as viewed from the side of the gap g according to an embodiment. FIG. 4C is a schematic view of the recess 20b (depressions 21c, 21d) of the turbocharger 100 as viewed from the side of the gap g according to an embodiment. FIG. 4D is a schematic view of the recess 20b (depressions 21e) of the turbocharger 100 as viewed from the side of the gap g according to an embodiment.

Figure 5A:
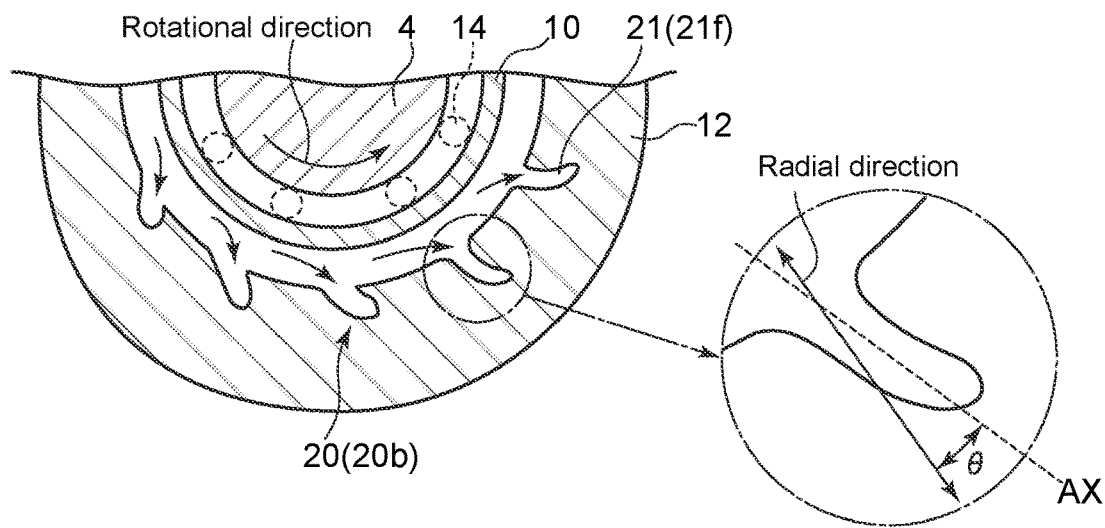
FIG. 5A is an enlarged cross-sectional view of the vicinity of the gap in a cross-section (axial position A) perpendicular to the rotational axis of the turbocharger according to an embodiment.
Figure 5B:
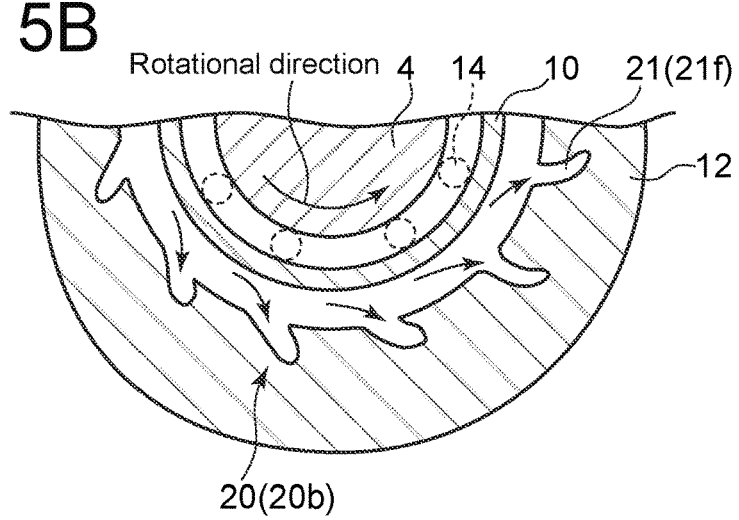
FIG. 5B is an enlarged cross-sectional view of the vicinity of the gap in a cross-section (axial position B) perpendicular to the rotational axis of the turbocharger according to an embodiment.
Figure 5C:
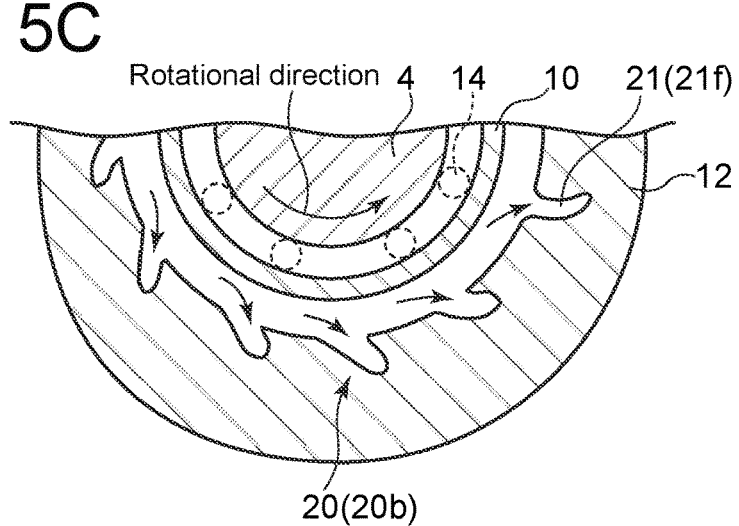
FIG. 5C is an enlarged cross-sectional view of the vicinity of the gap in a cross-section (axial position C) perpendicular to the rotational axis of the turbocharger according to an embodiment.

FIG. 5A is an enlarged cross-sectional view of the vicinity of the gap g in a cross-section (axial position A) perpendicular to the rotational axis CX of the turbocharger 100 according to an embodiment. FIG. 5B is an enlarged cross-sectional view of the vicinity of the gap g in a cross-section (axial position B) perpendicular to the rotational axis CX of the turbocharger 100 according to an embodiment. FIG. 5C is an enlarged cross-sectional view of the vicinity of the gap g in a cross-section (axial position C) perpendicular to the rotational axis CX of the turbocharger 100 according to an embodiment.

In some embodiments, as shown in FIGS. 3, 4A to 4D, and 5A to 5C, the recess 20b is disposed in the inner circumferential surface of the housing 12. The recess 20b includes a plurality of depressions 21 disposed independently of each other at intervals.

With the above configuration, the lubricant oil is collected in the depressions 21 disposed in the housing 12, and the lubricant oil comes out of the depressions 21 of the recess 20b even if a certain amount of the lubricant oil flows out of the gap g. Thus, the holding capacity of the lubricant oil is improved.

In some embodiments, as shown in FIGS. 4B, 4C, and 4D, the recess 20b includes the plurality of depressions 21 (21b, 21c, 21d, 21e) staggered in the inner circumferential surface of the housing 12. With the above configuration, each of the depressions has a partition wall, and an opening area of the recess 20b relative to the inner circumferential surface of the housing 12 increases. Thus, the holding capacity of the lubricant oil is improved. The opening area is an area of the opening facing the gap. As shown in FIG. 4A, the recess 20b may include the plurality of depressions 21a disposed at regular intervals in the circumferential direction and the axial direction.

In some embodiments, as shown in FIG. 4C, the recess 20b may include the plurality of depressions 21 (21c, 21d) which are different in opening area. In FIG. 4C, the recess 20b includes the depressions 21c, 21d having two patterns of opening areas. However, the plurality of depressions 21 included in the recess 20b may have not less than three patterns of opening areas, or may have different opening areas, respectively.

With the above configuration, it is possible to increase the number density of the depressions 21. Moreover, since each of the depressions 21 has the partition wall, and the opening area of the recess 20b relative to the inner circumferential surface of the housing 12 increases, the holding capacity of the lubricant oil is improved.

In some embodiments, as shown in FIG. 4D, the recess 20b may include the plurality of depressions 21 (21e) each having a hexagonally shaped partition wall. The plurality of partition walls of the plurality of depressions 21 (21e) constitute a honeycomb-shaped partition wall as a whole. In this case, the honeycomb-shaped partition wall makes the lubricant oil less flow and increases the opening area of the recess 20b relative to the inner circumferential surface of the housing 12. Thus, the holding capacity of the lubricant oil is improved.

Hereinafter, a centroid connecting line AX will be described in detail. The centroid connecting line AX is a line connecting centroids of the depression 21f in a cross-section parallel to a plane along an opening edge of the depression 21f.

Figure 6A:
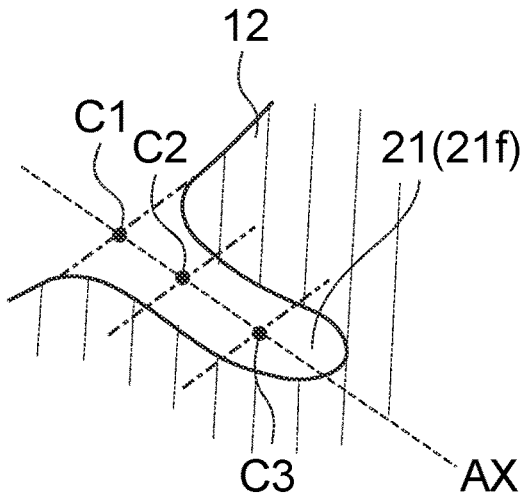
FIG. 6A is a view for describing a centroid connecting line, and is an enlarged cross-sectional view of the depression in the cross-section perpendicular to the rotational axis of the turbocharger according to an embodiment.
Figure 6B:
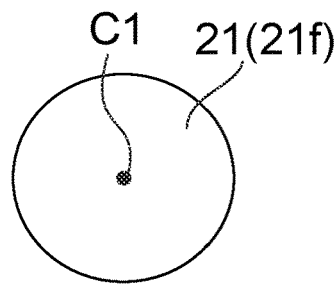
FIG. 6B is a view showing a first centroid in FIG. 6A.
Figure 6C:
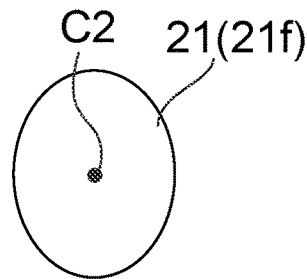
FIG. 6C is a view showing a second centroid in FIG. 6A.
Figure 6D:
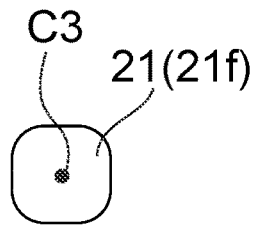
FIG. 6D is a view showing a third centroid in FIG. 6A.

FIG. 6A is a view for describing the centroid connecting line AX, and is an enlarged cross-sectional view of the depression 21f in the cross-section perpendicular to the rotational axis CX of the turbocharger 100 according to an embodiment. FIG. 6B is a view showing a first centroid C1 in FIG. 6A. FIG. 6C is a view showing a second centroid C2 in FIG. 6A. FIG. 6D is a view showing a third centroid C3 in FIG. 6A.

In FIG. 6A, the centroid in the cross-section along the opening edge of the depression 21 will be referred to as the first centroid C1. In addition, the centroids in two cross-sections parallel to the plane along the opening edge of the depression 21 will be referred to as the second centroid C2 and the third centroid C3, respectively. As shown in FIG. 6B, the first centroid is a centroid in the cross-section (circular shape) of the depression 21. As shown in FIG. 6C, the second centroid C2 is a centroid in the cross-section (elliptical shape) of the depression 21. FIG. 6D shows a centroid in the cross-section (substantially rectangular shape) of the depression 21.

The centroid connecting line AX is a connecting line passing through at least these three centroids. That is, the centroid connecting line is a line, in the depression 21, connecting the plurality of centroids of the cross-sectional shapes of the depression 21 in the plurality of cross-sections parallel to the plane along the opening edge of the depression 21. FIG. 6A shows a case where the centroid connecting line AX is a straight line. However, the centroid connecting line AX may be a curved line.

In some embodiments, as shown in FIGS. 5A to 5C, the recess 20*b* may include the plurality of depressions 21*f* each depressed such that the centroid connecting line AX crosses the radial direction. In this case, since the centroid connecting line AX in the cross-section of the depression 21*f* has a direction crossing the radial direction (crossing angle θ), the holding capacity of the lubricant oil is improved.

Moreover, as shown in FIGS. 5A to 5C, the centroid connecting line AX of the depression 21*f* of the recess 20*b* is directed downstream of the rotational direction of the shaft 4 serving as the rotational shaft, toward the radially outer side. In this case, it is possible to cause the lubricant oil, which flows in the circumferential direction in accordance with the rotation of the bearing support cylinder 10, to enter the recess 20*b* to be collected. Thus, the holding capacity of the lubricant oil is improved.

Figure 7:
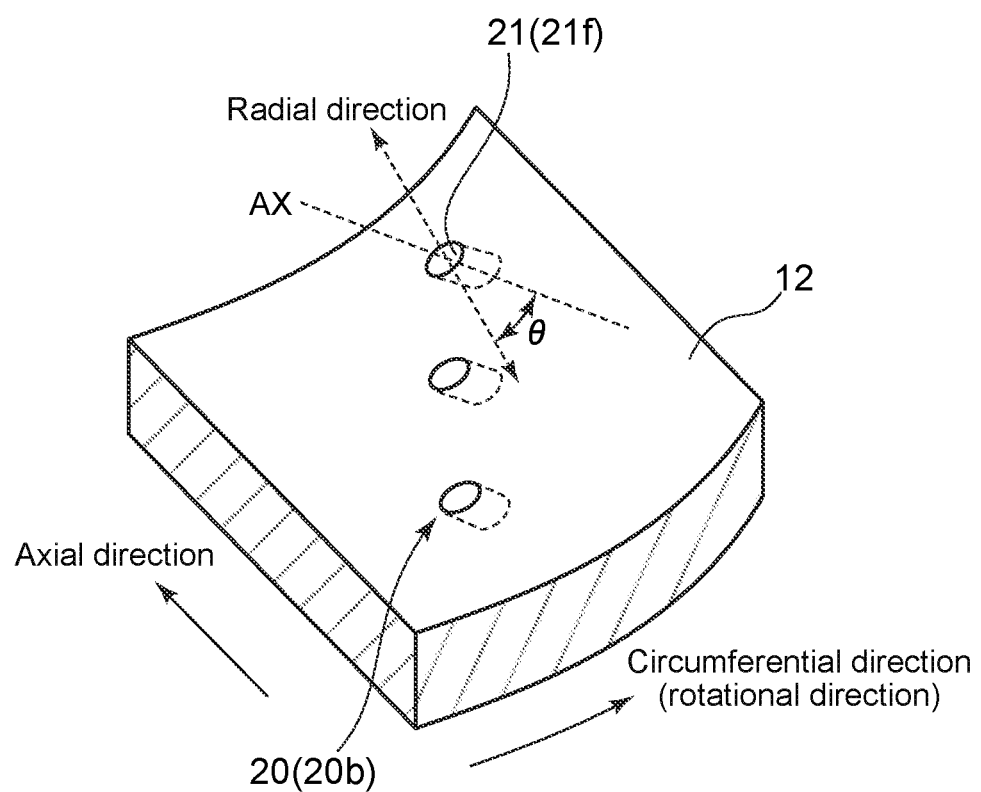
FIG. 7 is a perspective view of the recess (depressions) of the turbocharger as viewed from the gap side according to an embodiment.

FIG. 5B shows a cross-section at the axial position B shifted in the axial direction relative to the axial position A of FIG. 5A. FIG. 5C shows a cross-section at the axial position C further shifted in the axial direction relative to the axial position B of FIG. 5B. FIG. 7 is a perspective view of the recess 20*b* (depressions 21*f*) of the turbocharger 100 as viewed from the side of the gap g according to an embodiment. As viewed from the side of the gap g, the depressions 21*f* shown in FIGS. 5A to 5C are independently of each other at intervals and have different circumferential positions depending on the axial positions, as shown in FIG. 7.

Figure 8:
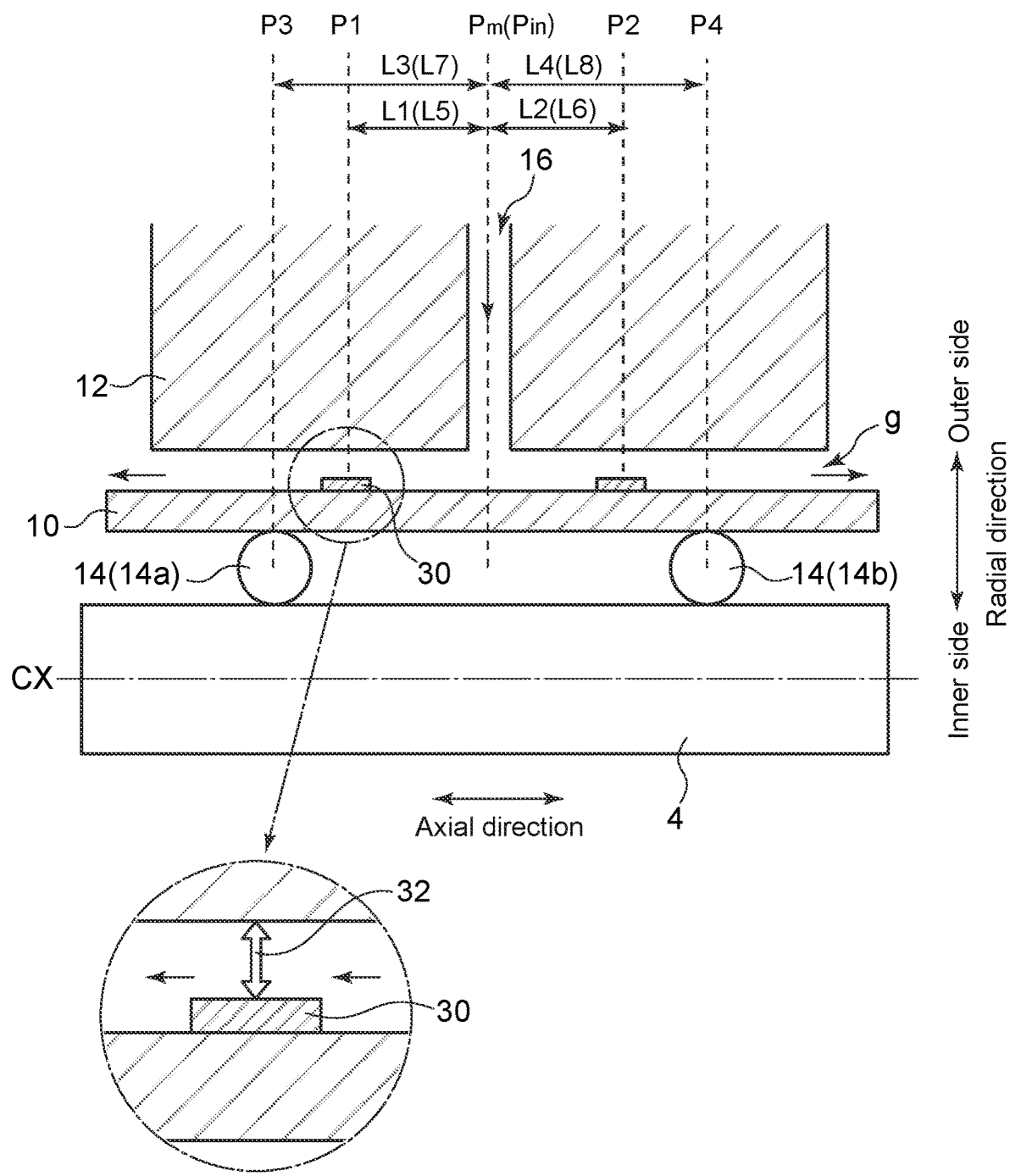
FIG. 8 is an enlarged cross-sectional view of the vicinity of the gap in the cross-section taken along the rotational axis of the turbocharger according to an embodiment.

In an embodiment, the protrusion 30 is disposed on at least one of the outer circumferential surface of the bearing support cylinder 10 and the inner circumferential surface of the housing 12, and the protrusion 30 partially narrows the gap g in the radial direction. FIG. 8 is an enlarged cross-sectional view of the vicinity of the gap g in the cross-section taken along the rotational axis CX of the turbocharger 100 according to an embodiment. For example, as shown in FIG. 8, the protrusion 30 is disposed on the outer circumferential surface of the bearing support cylinder 10. The protrusion 30 may be disposed on the inner circumferential surface of the housing 12.

With the above configuration, the Lomakin Effect works strongly when the lubricant oil passes through the narrow portion of the gap g. The Lomakin Effect is an effect where, if a flow passage cross-section is partially narrowed in a flow passage, a force acts which causes the flow passage cross-section of the narrow portion to coincide with a flow passage cross-section of another portion when a fluid passes through the narrow portion. In FIG. 8, as indicated by a double-headed arrow 32, the Lomakin Effect acts as a spring that expands the gap g in the radial direction at the position of the protrusion 30. Thus, a holding capability of a shaft center is improved, making it possible to reduce the shaft vibration.

In an embodiment, as shown in FIG. 8, the oil film holding portion includes a pair of protrusions 30 disposed at axially equidistant positions (positions P1, P2), respectively, from an intermediate position (position $P_m$) between a first axial position (position P3) and a second axial position (position P4). For example, in FIG. 8, an axial distance L1 from the position $P_m$ to the position P1 and an axial distance L2 from the position $P_m$ to the position P2 are the same distance. In this case, the Lomakin Effect acts at the axially equidistant positions of the pair of protrusions 30 from the intermediate position between the first axial position and the second axial position where the rolling elements 14 are arranged, respectively. Thus, it is possible to suppress occurrence of unbalance by the axial positions.

In an embodiment, as shown in FIG. 8, the rolling elements 14 (14*a*, 14*b*) and the pair of protrusions 30 are disposed at the axial positions on opposite sides of the inlet 16, and the protrusions 30 are each disposed at a position where an axial distance between the inlet 16 and the protrusion 30 is smaller than an axial distance between the inlet 16 and at least one rolling element 14 (14*a*, 14*b*). For example, in FIG. 8, an axial distance L5 from an axial position (position $P_{in}$) of the inlet 16 to the protrusion 30 (position P1) is smaller than an axial distance L7 from the axial position (position $P_{in}$) of the inlet 16 to the first axial position (position P3) of the first rolling element 14*a*. Likewise, an axial distance L6 from the axial position (position $P_{in}$) of the inlet 16 to the protrusion 30 (position P2) is smaller than an axial distance L8 from the axial position (position $P_m$) of the inlet 16 to the second axial position (position P4) of the second rolling element 14*b*.

In this case, since the pair of protrusions 30 are located upstream of the rolling elements 14 (14*a*, 14*b*), allowing the Lomakin Effect to act more strongly.

The configuration shown in FIG. 8 may be modified such that axial distances of the pair of protrusions 30 from the intermediate position between the first axial position and the second axial position are designed to be larger than an axial distance between the first rolling element 14*a* and the intermediate position between the first axial position and the second axial position, and an axial distance between the second rolling element 14*b* and the intermediate position between the first axial position and the second axial position. For example, in FIG. 8, the axial distance L1 from the intermediate position (position $P_m$) to the protrusion 30 (position P1) is smaller than the axial distance L3 from the intermediate position (position $P_m$) to the first rolling element 14*a* (position P3). Likewise, the axial distance L2 from the intermediate position (position $P_m$) to the protrusion 30 (position P2) is smaller than the axial distance L4 from the intermediate position (position $P_m$) to the second rolling element 14*b* (position P4). These relationships may be modified such that the axial distance L1 is designed to be larger than the axial distance L3, and the axial distance L2 is designed to be larger than the axial distance L4.

With the above configuration, the pair of protrusions 30 produce the Lomakin Effect at the positions away from the intermediate position relative to the first rolling element 14*a* and the second rolling element 14*b*, respectively. Thus, the holding capability of the shaft center is improved.

The axial positions of the protrusions 30, the inlet 16, the rolling element 14, and the like each mean an intermediate position in an axial width thereof. Moreover, in the example shown in FIG. 8, the axial position (position $P_m$) of the inlet 16, and the intermediate position (position $P_m$) between the first axial position (position P3) and the second axial position (position P4) are the same axial position. Accordingly, the axial distance L1 and the axial distance L5 are the same, and the axial distance L2 and the axial distance L6 are the same. Likewise, the axial distance L3 and the axial distance L7 are the same, and the axial distance L4 and the axial distance L8 are the same. However, the present invention is not limited to the case where these positions and distances are the same.

Figure 9:
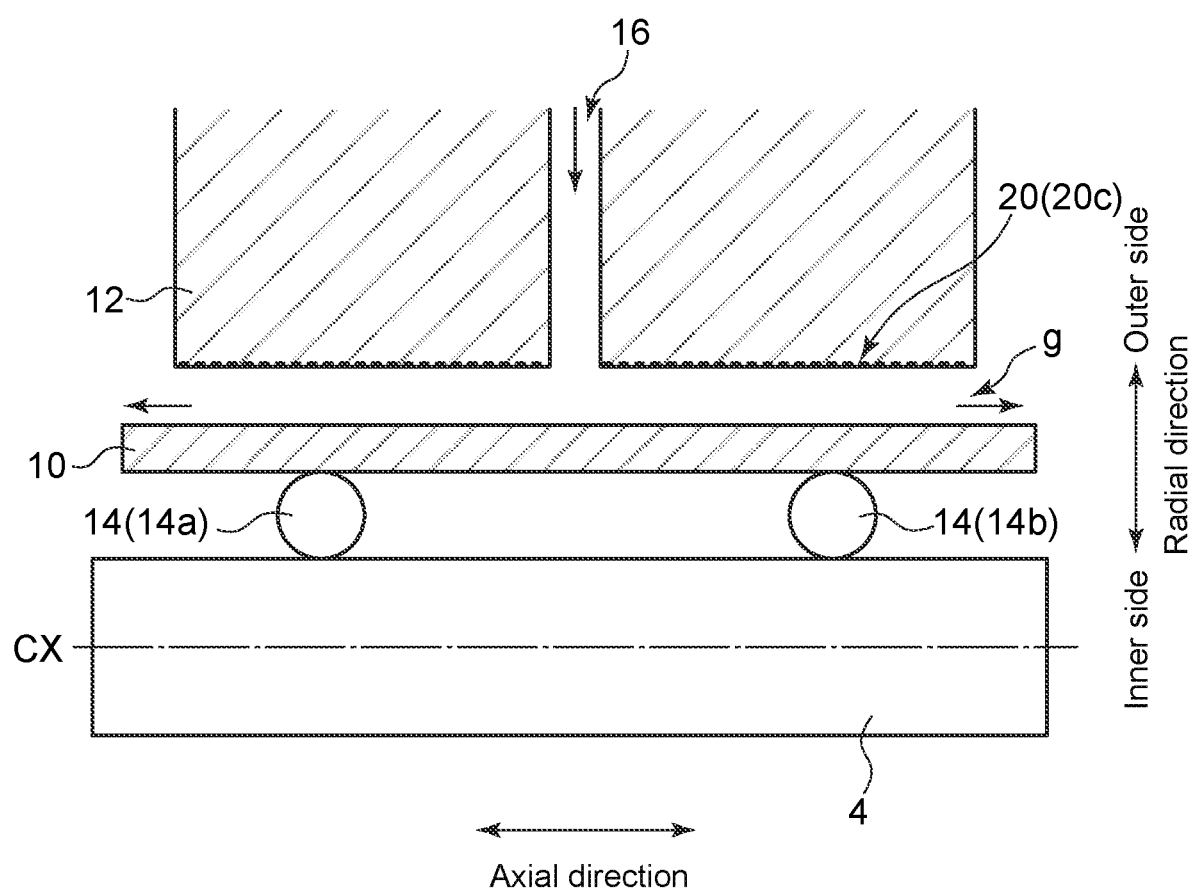
FIG. 9 is an enlarged cross-sectional view of the vicinity of the gap in the cross-section taken along the rotational axis of the turbocharger according to an embodiment.
Figure 10A:
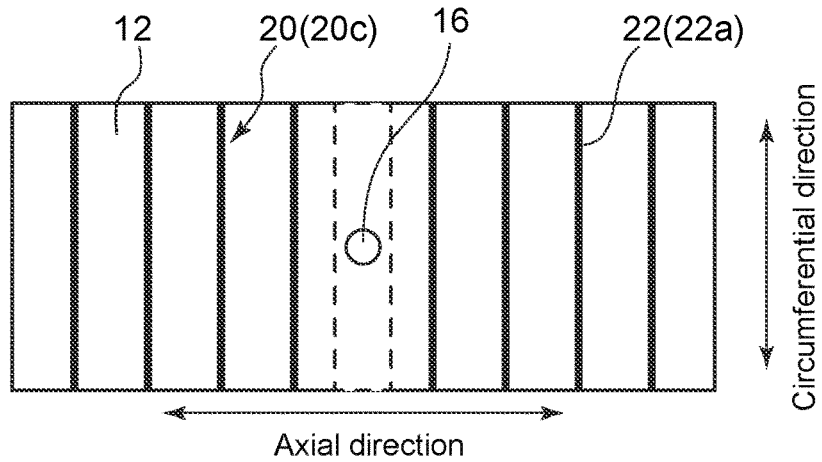
FIG. 10A is a schematic view of the recess (grooves) of the turbocharger as viewed from the gap side according to an embodiment.
Figure 10B:
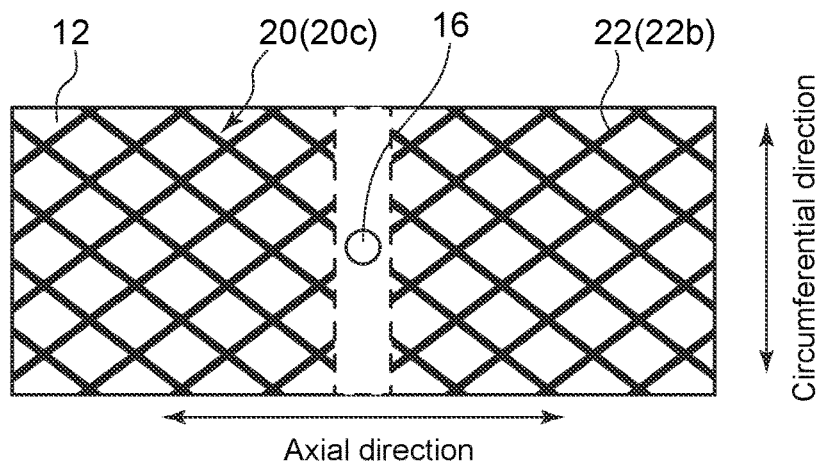
FIG. 10B is a schematic view of the recess (grooves) of the turbocharger as viewed from the gap side according to an embodiment.
Figure 10C:
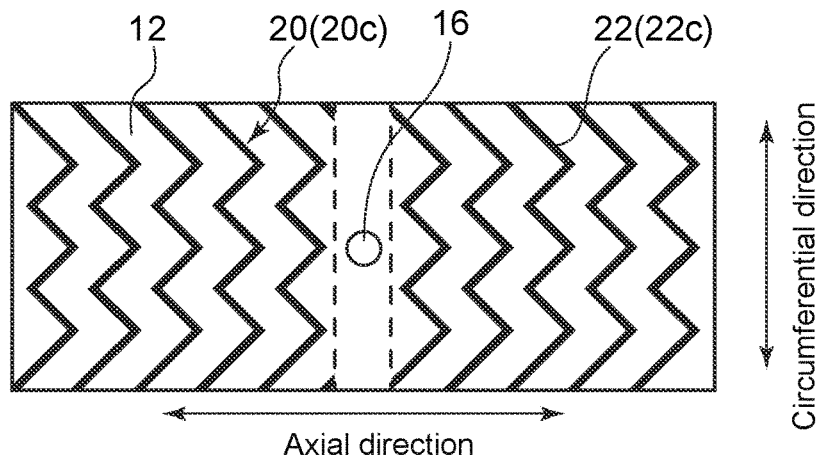
FIG. 10C is a schematic view of the recess (grooves) of the turbocharger as viewed from the gap side according to an embodiment.

FIG. 9 is an enlarged cross-sectional view of the vicinity of the gap g in the cross-section taken along the rotational axis CX of the turbocharger 100 according to an embodiment. FIG. 10A is a schematic view of a recess 20*c* (grooves 22*a*) of the turbocharger 100 as viewed from the side of the gap g according to an embodiment. FIG. 10B is a schematic view of the recess 20*c* (grooves 22*b*) of the turbocharger 100 as viewed from the side of the gap g according to an embodiment. FIG. 10C is a schematic view of the recess 20*c*

Figure 11:
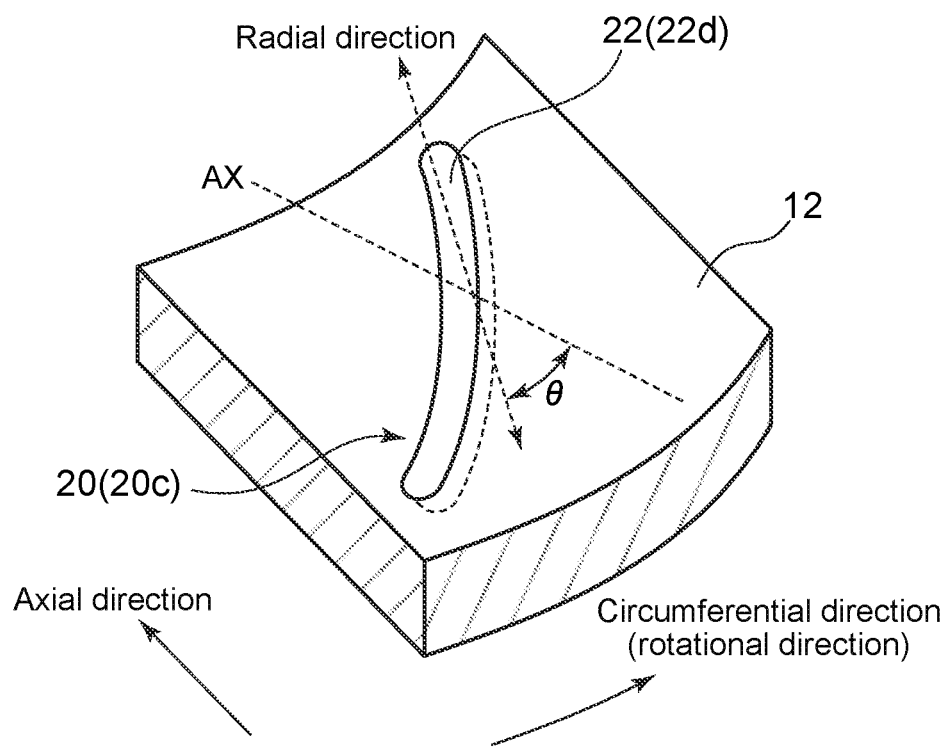
FIG. 11 is a perspective view of the recess (groove) of the turbocharger as viewed from the gap side according to an embodiment.

(grooves 22c) of the turbocharger 100 as viewed from the side of the gap g according to an embodiment. FIG. 11 is a perspective view of the recess 20c (groove 22d) of the turbocharger 100 as viewed from the side of the gap g according to an embodiment.

In some embodiments, as shown in FIGS. 9 to 11, the recess 20c is disposed in the inner circumferential surface of the housing 12, and the recess 20c includes the grooves 22. With the above configuration, the lubricant oil is collected in the grooves 22, and the lubricant oil comes out of the grooves 22 even if a certain amount of the lubricant oil flows out of the gap g. In each of FIGS. 10A to 10C, a region indicated by dotted lines represents an extension of the inlet 16 which is configured to extend in the circumferential direction so as to diffuse the lubricant oil flowing in along the radial direction in the circumferential direction.

The recess 20c includes the grooves 22a extending along the circumferential direction, for example, as shown in FIG. 10A. In this case, the grooves 22a extending along the circumferential direction cross an axial component in a flow velocity direction of the lubricant oil flowing from the inlet 16 in the axial direction and the circumferential direction, increasing a channel resistance and improving the holding capacity of the lubricant oil.

The recess 20c may include the lattice-shaped grooves 22b, for example, as shown in FIG. 10B, or may include herringbone-shaped grooves 22c, as shown in FIG. 10C. In this case, the grooves 22b, 22c of the recess 20c cross the axial component or a circumferential component in the flow velocity direction of the lubricant oil flowing from the inlet 16 in the axial direction and the circumferential direction, increasing the channel resistance and improving the holding capacity of the lubricant oil.

The recess 20c may include the groove 22d where the centroid connecting line AX connecting the centroids in the cross-section parallel to the plane along the opening edge of the groove 22d crosses the radial direction, for example, as shown in FIG. 11. In this case, since the centroid connecting line AX in the cross-section of the groove 22d has a direction crossing the radial direction (crossing angle θ), the holding capacity of the lubricant oil is improved. In the groove 22d of the recess 20c, the centroid connecting line AX is preferably directed downstream of the rotational direction of the shaft 4 serving as the rotational shaft, toward the radially outer side. In this case, it is possible to cause the lubricant oil, which flows in the circumferential direction in accordance with the rotation of the bearing support cylinder 10, to enter the recess 20c to be collected. Thus, the holding capacity of the lubricant oil is improved.

In the above-described embodiments, the oil film holding portion which is the recess 20 or the protrusion 30 has been described. However, the oil film holding portion is not limited to the above-described configuration. For example, the oil film holding portion may have a configuration in which oleophobic coating is discontinuously disposed on at least one of the inner circumferential surface of the housing 12 and the outer circumferential surface of the bearing support cylinder 10. A specific example thereof will be described below.

Figure 12:
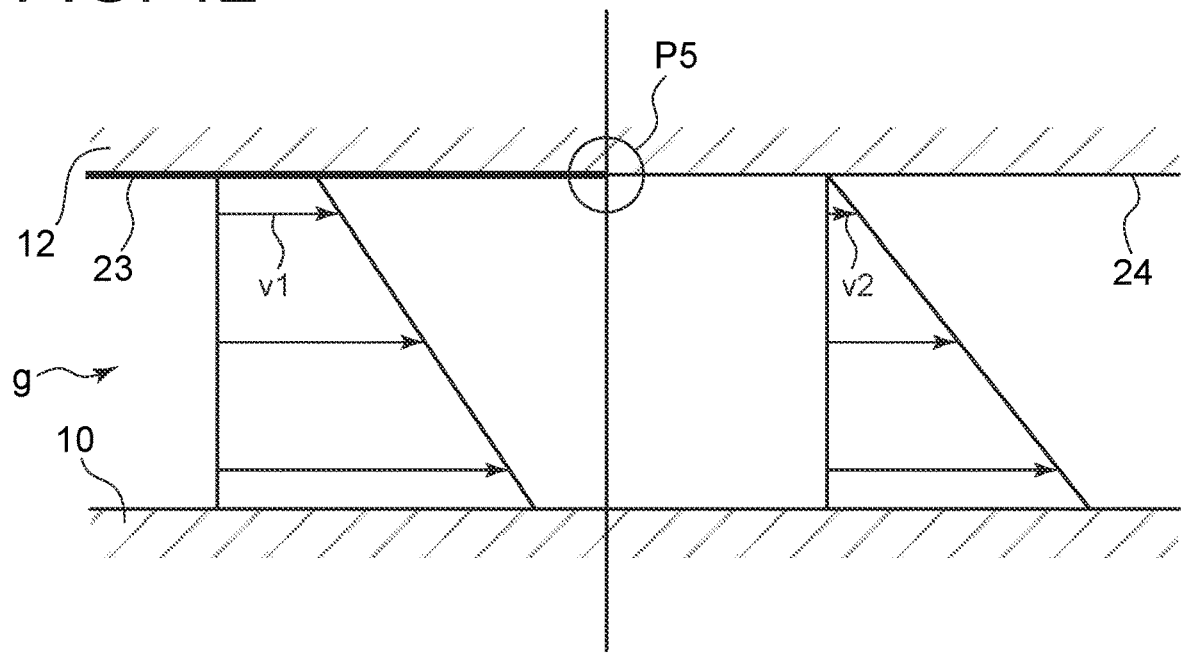
FIG. 12 is a conceptual view showing a change in velocity distribution of lubricant oil by presence or absence of oleophobic coating of the turbocharger according to an embodiment.

FIG. 12 is a conceptual view showing a change in velocity distribution of the lubricant oil by presence or absence of the oleophobic coating of the turbocharger 100 according to an embodiment. The conceptual view shows a state in which if an oleophobic coating 23 and a non-oleophobic coating 24 are disposed on the inner circumferential surface of the housing 12, the flow velocity of the lubricant oil passing through a boundary between the oleophobic coating 23 and the non-oleophobic coating 24 changes.

In a usage state, the bearing support cylinder 10 slowly rotates in accordance with the rotation of the shaft 4, whereas the housing 12 remains still. In such state, the lubricant oil flowing through the gap g passes through an axial position of the oleophobic coating 23, and then passes through an axial position of the non-oleophobic coating 24.

In this case, a pressure is generated by a difference in shear flow rate in the radial direction. As shown in FIG. 12, a flow velocity distribution v1 when the lubricant oil passes through the vicinity of the oleophobic coating 23 has a trapezoidal shape, and a flow velocity distribution v2 when the lubricant oil passes through the vicinity of the non-oleophobic coating 24 has a triangular shape.

This means that the lubricant oil slips on the surface of the oleophobic coating 23 and thus has the high velocity, whereas the lubricant oil less slips on the surface of the non-oleophobic coating 24 and thus has the low velocity. In the example shown in FIG. 13, the velocity on the surface of the non-oleophobic coating 24 is zero, and the flow velocity distribution v2 has the triangular shape. However, the flow velocity distribution v2 may have a trapezoidal shape whose upper base is small relative to the flow velocity distribution v1.

At a position P5 in the vicinity of the boundary between the oleophobic coating 23 and the non-oleophobic coating 24, a pressure is generated due to the discontinuous velocity and serves as a barrage against the flow of the lubricant oil. Thus, the flow is blocked, decreasing the flow velocity of the lubricant oil. Thus, the oil film holding portion is formed by alternately arranging the oleophobic coatings 23 and the non-oleophobic coatings 24, improving the holding capacity of the lubricant oil.

Figure 13:
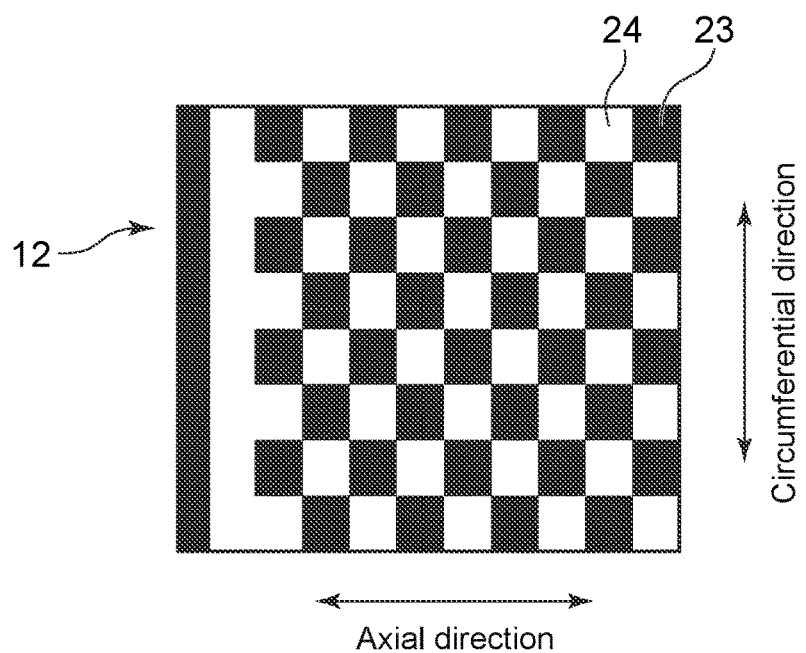
FIG. 13 is a schematic view of arrangement of the oleophobic coating of the turbocharger as viewed from the gap side according to an embodiment.

FIG. 13 is a schematic view of arrangement of the oleophobic coating of the turbocharger 100 as viewed from the side of the gap g according to an embodiment. In an embodiment, as shown in FIG. 13, the oleophobic coatings 23 and the non-oleophobic coatings 24 are staggered on the inner circumferential surface of the housing 12. More specifically, the oleophobic coatings 23 and the non-oleophobic coatings 24 are alternately arranged in the axial direction and the circumferential direction. With the above configuration, the lubricant oil hardly flows in the circumferential direction and the axial direction in the gap g, improving the holding capacity of the lubricant oil.

Moreover, in FIG. 13, at the axial position to be an outlet where the lubricant oil flows out of the gap g in the axial direction, the oleophobic coating 23 is disposed along the circumferential direction. With the above configuration, the lubricant oil is easily collected in the vicinity of the outlet, improving the holding capacity of the lubricant oil.

The arrangement of the oleophobic coatings 23 and the non-oleophobic coatings 24 is not limited to the staggered arrangement. For example, the oleophobic coatings 23 and the non-oleophobic coatings 24 may alternately be arranged in the axial direction or the circumferential direction. Alternatively, the configuration where the oleophobic coating 23 and the non-oleophobic coating 24 are arranged may be combined with the configuration where the above-described recess 20, protrusion 30, and the like are disposed.

Not the configuration where the oleophobic coatings 23 and the non-oleophobic coatings 24 are alternately arranged, but a configuration where lipophilic coatings and non-lipophilic coatings are alternately arranged may be applied to at least one of the inner circumferential surface of the housing 12 and the outer circumferential surface of the bearing support cylinder 10. Alternatively, a configuration may be applied in which sections with the oleophobic coatings 23 being disposed and sections without the oleophobic coatings 23 being disposed are alternately arranged. A configuration may be applied in which sections with the lipophilic coatings being disposed and sections without the lipophilic coatings being disposed are alternately arranged.

That is, it is only necessary that the oil film holding portion is configured to change the velocity of the lubricant oil flowing through the gap g by the coatings and to serve as the barrage against the flow of the lubricant oil. In the present application, the terms such as oleophobicity and lipophilicity mean that oleophobicity, lipophilicity, and the like are higher with reference to a major fundamental property (that is, a property before coating processing is performed) of a member (for example, the housing 12 or the bearing support cylinder 10).

The present invention is not limited to the above-described embodiments, and also includes an embodiment obtained by modifying the above-described embodiments and an embodiment obtained by combining these embodiments as appropriate.

REFERENCE SIGNS LIST

2 Turbine rotor
4 Shaft
6 Impeller
8 Bearing
10 Bearing support cylinder
12 Housing
14, 14a, 14b Rolling element
16 Inlet
18 Porous layer
20, 20a, 20b, 20c Recess
22, 22a, 22b, 22c, 22d Groove
23 Oleophobic coating
23 Oleophobic coating
24 Non-oleophobic coating
24 Non-oleophobic coating
30 Protrusion
32 Double-headed arrow
100 Turbocharger
AX Centroid connecting line
CX Rotational axis
G Gap
v1, v2 Flow velocity distribution

The invention claimed is:

1. A turbocharger, comprising:
   a rolling bearing including at least one rolling element for rotatably supporting a rotational shaft;
   a bearing support cylinder located on a radially outer side relative to the rolling bearing, for supporting the rolling bearing; and
   a housing located on the radially outer side relative to the bearing support cylinder, for covering a circumference of the bearing support cylinder,
   wherein, between an outer circumferential surface of the bearing support cylinder and an inner circumferential surface of the housing, a gap for forming an oil film by inflow of lubricant oil is provided,
   wherein at least one of the outer circumferential surface of the bearing support cylinder and the inner circumferential surface of the housing includes an oil film holding portion for suppressing outflow of the lubricant oil from the gap, and
   wherein the oil film holding portion is a protrusion disposed on the outer circumferential surface of the bearing support cylinder, or the protrusion is disposed, wherein at least a part of the housing is a porous layer, on the inner circumferential surface of the housing.

2. The turbocharger according to claim 1,
   wherein the protrusion is disposed on at least one of the outer circumferential surface of the bearing support cylinder and the inner circumferential surface of the housing, and
   wherein the protrusion partially narrows the gap in a radial direction.

3. The turbocharger according to claim 2,
   wherein the at least one rolling element includes:
   a plurality of first rolling elements arranged in a circumferential direction at a first axial position; and
   a plurality of second rolling elements arranged in the circumferential direction at a second axial position different from the first axial position, and
   wherein the oil film holding portion includes a pair of protrusions disposed at axially equidistant positions, respectively, from an intermediate position between the first axial position and the second axial position.

4. The turbocharger according to claim 3,
   wherein the housing has an inlet allowing the lubricant oil to flow into the gap, and
   wherein the at least one rolling element and the pair of protrusions are disposed at axial positions on opposite sides of the inlet, and the protrusions are disposed at positions where axial distances between the inlet and the protrusions are smaller than an axial distance between the inlet and the at least one rolling element.

5. The turbocharger according to claim 3,
   wherein axial distances of the pair of protrusions from the intermediate position are larger than an axial distance between the intermediate position and the first rolling element and an axial distance between the intermediate position and the second rolling element.

* * * * *